United States Patent
Jung et al.

(10) Patent No.: US 11,216,694 B2
(45) Date of Patent: Jan. 4, 2022

(54) METHOD AND APPARATUS FOR RECOGNIZING OBJECT

(71) Applicant: SAMSUNG ELECTRONICS CO., LTD., Suwon-si (KR)

(72) Inventors: Hyun-joo Jung, Seoul (KR); Gun-hee Lee, Anyang-si (KR); In-kwon Choi, Seongnam-si (KR); Sung-jin Kim, Yongin-si (KR); Hyun-soo Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 34 days.

(21) Appl. No.: 16/633,825

(22) PCT Filed: Jul. 11, 2018

(86) PCT No.: PCT/KR2018/007828
§ 371 (c)(1),
(2) Date: Jan. 24, 2020

(87) PCT Pub. No.: WO2019/031714
PCT Pub. Date: Feb. 14, 2019

(65) Prior Publication Data
US 2020/0242402 A1    Jul. 30, 2020

(30) Foreign Application Priority Data
Aug. 8, 2017    (KR) .................. 10-2017-0100514

(51) Int. Cl.
*G06K 9/62*    (2006.01)
*G06K 9/46*    (2006.01)
(Continued)

(52) U.S. Cl.
CPC ............. *G06K 9/6256* (2013.01); *G06K 9/46* (2013.01); *G06K 9/6232* (2013.01); *G06N 3/04* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 9,542,419 | B1 | 1/2017 | Vanhoucke et al. |
| 11,093,805 | B2 | 8/2021 | Han et al. |

(Continued)

FOREIGN PATENT DOCUMENTS

| | | |
|---|---|---|
| KR | 10-2016-0072768 | 6/2016 |
| KR | 10-1657495 | 9/2016 |

(Continued)

OTHER PUBLICATIONS

International Search Report dated Oct. 23, 2018 for PCT/KR2018/007828 and English-language translation.

(Continued)

*Primary Examiner* — Leon Flores
(74) *Attorney, Agent, or Firm* — Nixon & Vanderhye, P.C.

(57) ABSTRACT

The present disclosure relates to an artificial intelligence (AI) system for simulating functions of a human brain such as cognition and decision-making by using machine learning algorithms such as deep learning, and applications thereof. In particular, the present disclosure provides a method of recognizing an object by using an AI system and its application, including: extracting pieces of first feature information respectively regarding a plurality of images, each image including an object; generating at least one piece of second feature information representing a correlation between the plurality of images by combining together the extracted (Continued)

pieces of first feature information respectively regarding the plurality of images; and recognizing, based on the at least one piece of second feature information, the object included in each of the plurality of images by using a pre-generated learning network model.

15 Claims, 13 Drawing Sheets

(51) Int. Cl.
*G06N 3/04* (2006.01)
*G06N 3/08* (2006.01)

(56) References Cited

U.S. PATENT DOCUMENTS

| 2015/0379371 | A1* | 12/2015 | Yoon | G06K 9/00201 |
| | | | | 382/103 |
| 2016/0125273 | A1 | 5/2016 | Matsunaga | |
| 2017/0032222 | A1* | 2/2017 | Sharma | G06K 9/4619 |
| 2018/0039853 | A1* | 2/2018 | Liu | G06K 9/72 |
| 2019/0251383 | A1* | 8/2019 | Senay | G06N 3/08 |

FOREIGN PATENT DOCUMENTS

| KR | 10-2016-0131848 | 11/2016 |
| KR | 10-2017-0030332 | 3/2017 |

OTHER PUBLICATIONS

Written Opinion dated Oct. 23, 2018 for PCT/KR2018/007828 and English-language translation.

Iandola, Forrest N. et al., "SqueezeNet: AlexNet-level accuracy with 50x fewer parameters and< 0.5 MB model size" under review as a conference paper at ICLR 2017, pp. 1-13.

Simonyan, Karen, et. al., "Very deep convolutional networks for large-scale image recognition," published as a conference paper at ICLR 2015, pp. 1-14.

Ji, Shuiwang, et al., "3D convolutional neural networks for human action recognition," IEEE Transaction on Pattern Analysis and Machine Intelligence, vol. 35, No. 1, Jan. 2013, pp. 221-231.

Karpathy, Andrej, et al. "Large-scale video classification with convolutional neural networks," CVPR 2014 paper, IEEE, 8 pages.

Ng, Joe Yue-Hei, et al. "Beyond short snippets: Deep networks for video classification," CVPR 2015 paper, IEEE, pp. 4694-4702.

Jung, Hyunjoo et al., "Efficient Object Recognition System with Multi-frame for Embedded AI," Samsung Best Paper Award 2017 (8 pages).

Extended European Search Report for EP Application No. 18843146.4.

Tao et al., "Siamese instance search for tracking (w/ supplemetary material)"; SINT Project, Apr. 8, 2016 (13 pages).

Held, David et al. "Learning to Track at 100 FPS with Deep Regression Networks", Sep. 17, 2016, International Conference on Financial Cryptography and Data Security; [Lecture Notes in Computer Science; Lect. Notes Computer], Springer, Berlin, Heidelberg, pp. 749-765 (17 pages).

Gordo, Albert et al., "End-to-End Learning of Deep Visual Representations for Image Retrieval", International Journal of Computer Vision, Kluwer Academic Publishers, Norwell, US, vol. 124, No. 2, Jun. 5, 2017, pp. 237-254 (18 pages).

Notice of Non-Final Rejection dated Nov. 3, 2021 in counterpart Korean Patent Application No. 10-2017-0100514 and partial English-language translation.

* cited by examiner

METHOD AND APPARATUS FOR RECOGNIZING OBJECT

This application is the U.S. national phase of International Application No. PCT/KR2018/007828 filed Jul. 11, 2018 which designated the U.S. and claims priority to Korean Patent Application No. 10-2017-0100514 filed Aug. 8, 2017, the entire contents of each of which are hereby incorporated by reference.

TECHNICAL FIELD

The present disclosure relates to an object recognition method, an object recognition apparatus, and a recording medium having recorded thereon a program for performing the object recognition method.

BACKGROUND ART

An artificial intelligence (AI) system is a computer system that realizes human-level intelligence, and enables machines to become smart by learning and making decisions on their own, compared to an existing rule-based smart system. The AI system may improve their recognition rates and are capable of understanding a user's preferences more accurately through experience. Thus, the existing rule-based smart systems have been increasingly replaced by deep learning-based AI systems.

AI technology consists of machine learning (deep learning) and element technologies using the machine learning.

Machine learning is an algorithmic technique for autonomously classifying/learning features of input data, and element technologies are technologies for simulating functions of a human brain such as cognition and decision-making by using machine learning algorithms and include technical fields such as linguistic understanding, visual understanding, reasoning/prediction, knowledge representation, motion control, etc.

Various technical fields to which AI technology is applied are as follows. Linguistic understanding is a technology for recognizing human language/characters for application/processing and includes natural language processing, machine translation, a dialog system, question answering, speech recognition/synthesis, etc. Visual understanding is a technology for recognizing and processing an object, in the same way as performed by a human visual system, and includes object recognition, object tracking, image retrieval, person recognition, scene understanding, spatial understanding, image enhancement, etc. Reasoning/prediction is a technology for judging information and logically inferring and predicting new information and includes knowledge/probability-based interference, optimization prediction, preference-based planning, recommendations, etc. Knowledge representation is a technology for automatically processing information about human experience as knowledge data and includes knowledge construction (data generation/classification), knowledge management (data utilization), etc. Motion control is a technology for controlling autonomous driving of a vehicle and motion of a robot and includes movement control (navigation, collision avoidance, and travelling), manipulation control (action control), etc.

SUMMARY

Provided are an object recognition method and apparatus, whereby an object in an image may be effectively recognized by extracting unstructured features of a specific object from a plurality of images including the specific object and using the result of combining the extracted features of the object for recognition of the object, and a recording medium.

The present disclosure provides a method of recognizing an object by using an artificial intelligence system and its application, the method including: extracting pieces of first feature information respectively regarding a plurality of images, each image including an object; generating at least one piece of second feature information representing a correlation between the plurality of images by combining together the extracted pieces of first feature information respectively regarding the plurality of images; and recognizing, based on the at least one piece of second feature information, the object included in each of the plurality of images by using a pre-generated learning network model.

DETAILED DESCRIPTION OF EXAMPLE EMBODIMENTS

Figure 1:
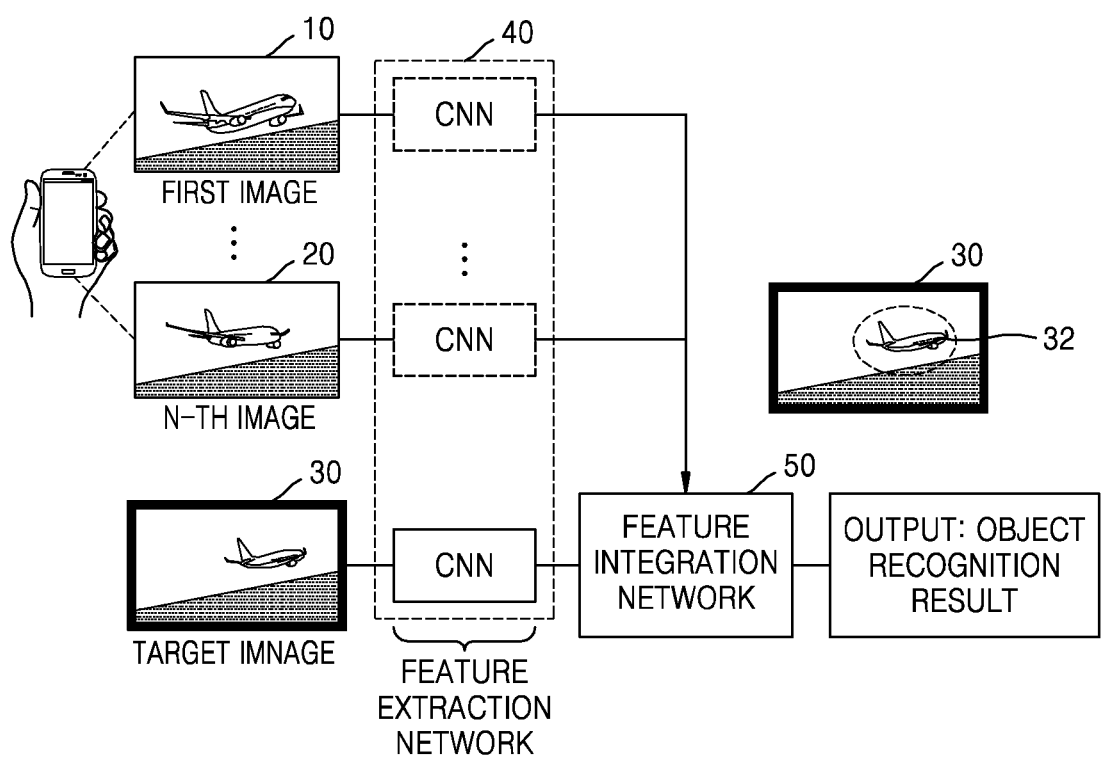
FIG. 1 is a conceptual diagram for explaining an object recognition method performed by an object recognition apparatus, according to an embodiment.

According to an embodiment, an object recognition method includes: extracting pieces of first feature information respectively regarding a plurality of images, each image including an object; generating at least one piece of second feature information representing a correlation between the plurality of images by combining together the extracted pieces of first feature information respectively regarding the plurality of images; and recognizing, based on the at least one piece of second feature information, the object included in each of the plurality of images by using a pre-generated learning network model.

In the object recognition method, the generating of the at least one piece of second feature information may include generating second feature information representing at least one of a similarity and a difference between the plurality of images by linearly combining the extracted pieces of first feature information respectively regarding the plurality of images.

According to an embodiment, an object recognition apparatus includes: a memory storing one or more instructions; an output unit; and a processor configured to execute the one or more instructions, which are stored in the memory, to: extract pieces of first feature information respectively regarding a plurality of images, each image including an object; generate at least one piece of second feature information representing a correlation between the plurality of images by combining together the extracted pieces of first feature information respectively regarding the plurality of images; and recognize, based on the at least one piece of second feature information, the object included in each of the plurality of images by using a pre-generated learning network model.

MODE OF DISCLOSURE

Terms used herein will now be briefly described and then the present disclosure will be described in detail.

The terms used in the present disclosure are general terms currently widely used in the art based on functions described in the present disclosure, but may have different meanings according to an intention of one of ordinary skill in the art, precedent cases, or advent of new technologies. Furthermore, some terms may be arbitrarily selected by the applicant, and in this case, the meaning of the selected terms will be described in detail in the detailed description of the disclosure. Thus, the terms used herein should be defined not by simple appellations thereof but based on the meaning of the terms together with the overall description of the disclosure.

It will be understood that, although the terms including an ordinal number such as "first", "second", etc. may be used herein to describe various elements, these elements should not be limited by the terms. The terms are only used to distinguish one element from another element. For example, a first element to be discussed below may be termed a second element without departing from the scope of the present disclosure. Similarly, a second element may be termed a first element. As used herein, the term "and/or" includes any and all combinations of one or more of the associated listed items.

Throughout the specification, when a part "includes" or "comprises" an element, unless there is a particular description contrary thereto, the part can further include other elements, not excluding the other elements. Furthermore, as used herein, the term "unit" denotes a software element or a hardware element such as a field-programmable gate array (FPGA) or an application-specific integrated circuit (ASIC), and performs certain functions. However, the term "unit" is not limited to software or hardware. The "unit" may be formed so as to be in an addressable storage medium, or may be formed so as to operate one or more processors. Thus, for example, the term "unit" may include elements such as software elements, object-oriented software elements, class elements and task elements, processes, functions, attributes, procedures, subroutines, segments of program code, drivers, firmware, micro-codes, circuits, data, a database, data structures, tables, arrays, or variables. Functions provided by the elements and "units" may be combined into the smaller number of elements and "units", or may be divided into additional elements and "units".

Embodiments of the present disclosure will now be described more fully hereinafter with reference to the accompanying drawings so that they may be easily implemented by one of ordinary skill in the art. However, the present disclosure may have different forms and should not be construed as being limited to the descriptions set forth herein. Parts not related to the present disclosure are omitted to clarify the description of embodiments thereof, and like reference numerals denote like elements throughout.

FIG. 1 is a conceptual diagram for explaining an object recognition method performed by an object recognition apparatus (100 of FIG. 12), according to an embodiment.

Referring to FIG. 1, the object recognition apparatus 100 may obtain a plurality of images 10, 20, and 30, each image including an object. For example, the object recognition apparatus 100 may receive the plurality of images 10, 20, and 30 from an external device. As another example, the plurality of images 10, 20, and 30 including the object may be obtained using a camera including the object recognition apparatus 100. In this case, an image may be used in the same sense as the term such as a scene, a frame, etc. Furthermore, the plurality of images 10, 20, and 30 may respectively include images temporally or taxonomically related to one another. For example, the plurality of images 10, 20, and 30 may be images generated by photographing the same object or an object of the same category at different times or at different locations.

For convenience of description, an image to be subjected to recognition from among the plurality of images 10, 20, and 30 is described as a target image 30 while other images associated with the target image 30 are described as first and second images 10 and 20.

The object recognition apparatus 100 may acquire pieces of first feature information respectively regarding the plurality of images 10, 20, and 30 by using a pre-generated first learning network model 40. In the present specification, the first learning network model 40 may also be described as a feature extraction network. Furthermore, first feature information of the image (e.g., the image 30) may include colors that make up the image and an edge, a polygon, saturation, brightness, a color temperature, blur, sharpness, and contrast of the image, but is not limited thereto.

According to an embodiment, the object recognition apparatus 100 may combine together the acquired pieces of first feature information respectively regarding the plurality of images 10, 20, and 30 to acquire at least one piece of second feature information representing a correlation between the plurality of images 10, 20, and 30. For example, the object recognition apparatus 100 may acquire the at least one piece of second feature information via a linear combination performed by adding or subtracting the pieces of first feature information respectively acquired from the plurality of images 10, 20, and 30. In this case, although the first feature information may be acquired in a vector form, this is merely an embodiment, and the first feature information is not limited to a vector form.

According to an embodiment, the object recognition apparatus 100 may recognize, based on the acquired at least one piece of second feature information, an object 32 included in the target image 30 by using a pre-generated second learning network model 50. In the present specification, the second learning network model 50 may be also described as a feature integration network.

According to an embodiment, even when an object is moving, or a shape and a size of the object are unstructured due to movement of a photographing device or the object recognition apparatus 100, the object recognition apparatus 100 may combine together pieces of feature information extracted from a plurality of images, each image including the object, and use a result of the combination for object recognition, thereby improving the accuracy of object recognition.

Furthermore, the object recognition apparatus 100 may be a smartphone, a tablet PC, a PC, a smart TV, a mobile phone, a personal digital assistant (PDA), a laptop, a media player, a micro server, an electronic book object recognition apparatus, a kiosk, an MP3 player, a digital camera, a robot vacuum cleaner, home appliances, or other mobile or non-mobile computing devices, but is not limited thereto. In addition, the object recognition apparatus 100 may be a wearable device such as a watch, glasses, a hair band, and a ring having a communication function and a data processing function.

Figure 2:
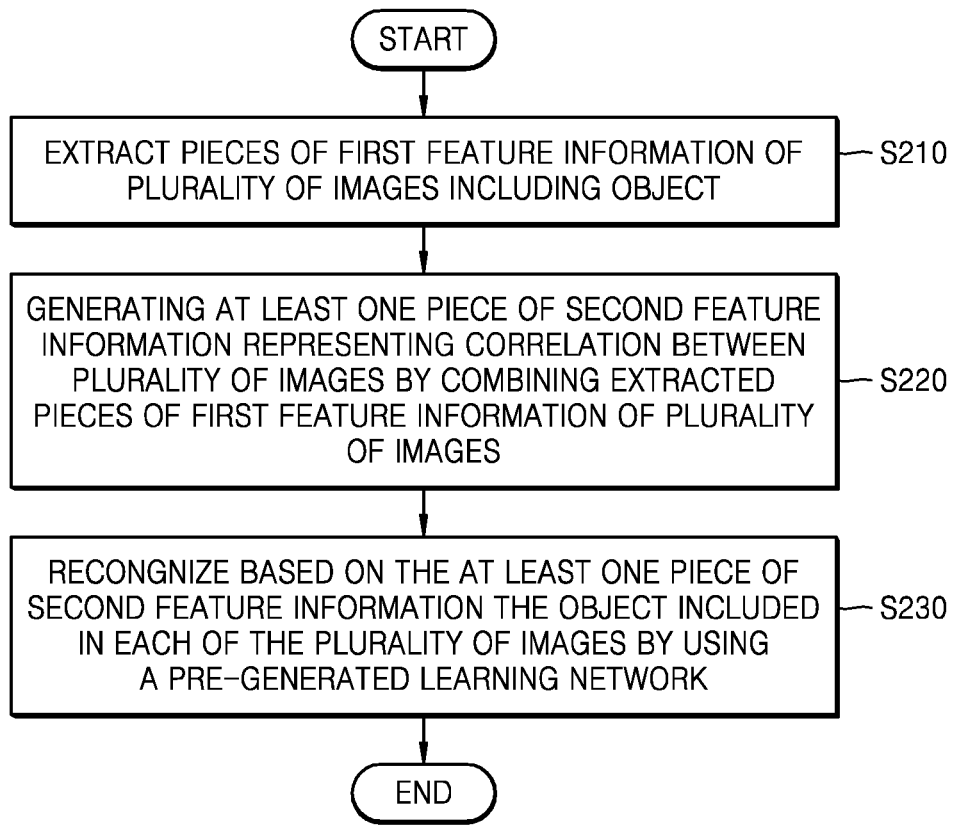
FIG. 2 is a flowchart of an object recognition method performed by an object recognition apparatus, according to an embodiment.

FIG. 2 is a flowchart of an object recognition method performed by an object recognition apparatus, according to an embodiment.

In operation S210, the object recognition apparatus may extract pieces of first feature information respectively regarding a plurality of images, each image including an object.

According to an embodiment, the object recognition apparatus may respectively acquire pieces of first feature information from a plurality of images by using a pre-generated first learning network model. In this case, the first learning network model may be composed of a plurality of neural networks for respectively extracting pieces of first feature information in parallel from a plurality of images. However, this is merely an embodiment, and the object recognition apparatus may sequentially acquire the pieces of first feature information from the plurality of images by using the pre-generated first learning network model.

Furthermore, the first learning network model may be stored in the object recognition apparatus, but according to another embodiment, the object recognition apparatus may acquire pieces of first feature information respectively regarding the plurality of images by using a first learning network model stored in an external server. In this case, the object recognition apparatus may request the external server to extract the pieces of first feature information by transmitting to the external server the plurality of images or information about positions where the plurality of images are to be obtained.

According to another embodiment, the object recognition apparatus may acquire pieces of first feature information by respectively analyzing a plurality of images instead of using a first learning network model.

In operation S220, the object recognition apparatus may generate at least one piece of second feature information regarding a correlation between the plurality of images by combining together the extracted pieces of first feature information of the plurality of images.

According to an embodiment, the object recognition apparatus may combine together the extracted pieces of first feature information respectively regarding the plurality of images. For example, the object recognition apparatus may linearly combine pieces of first feature information respectively regarding the plurality of images via operations of adding or subtracting first feature vectors that respectively constitute the pieces of first feature information. By doing so, the object recognition apparatus may generate at least one piece of second feature information respectively representing a difference and a similarity between the plurality of images The difference may include feature information that may vary depending on a photographing situation such as a location and a time at which the object is photographed. The similarity may include unique information of the object that remains unchanged according to a photographing situation.

In operation S230, the object recognition apparatus may recognize, based on the at least one piece of second feature information, the object included in each of the plurality of images by using a pre-generated learning network model.

According to an embodiment, the object recognition apparatus may acquire, as output data, a result of recognizing the object in a target image from among the plurality of images by applying, as input data, the at least one piece of second feature information to the pre-generated learning network model.

Figure 3:
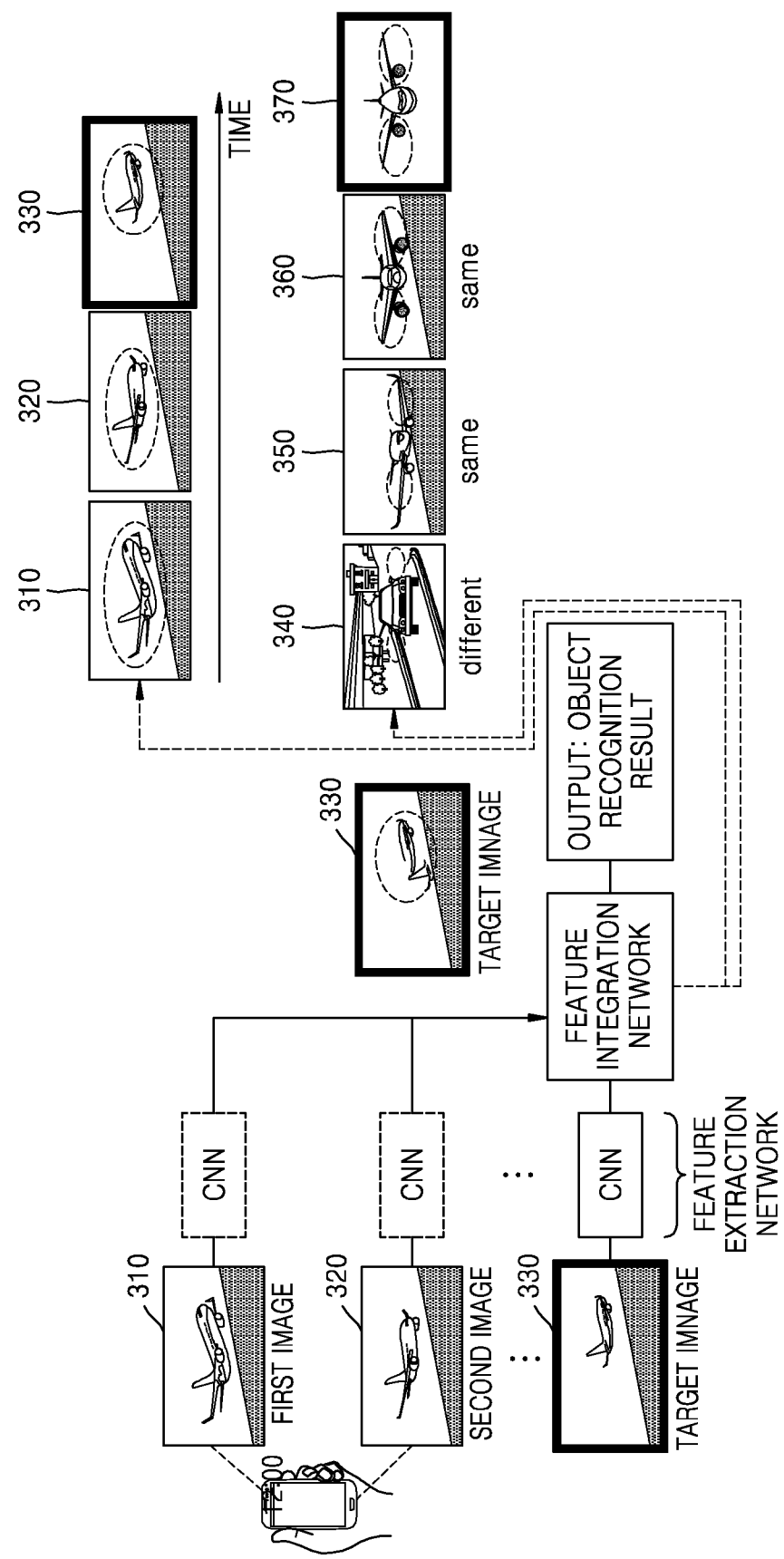
FIG. 3 is a diagram for explaining a method, performed by an object recognition apparatus, of recognizing an object included in a target image via a combination of pieces of feature information of a plurality of images, according to an embodiment.

FIG. 3 is a diagram for explaining a method, performed by the object recognition apparatus 100, of recognizing an object included in a target image via a combination of pieces of feature information of a plurality of images, according to an embodiment.

Referring to FIG. 3, to recognize an object included in a target image 330, the object recognition apparatus 100 may obtain a plurality of images 310, 320, and 340 through 370 associated with the target image 330. In this case, the plurality of images 310, 320, and 340 through 370 associated with the target image 330 may be temporally or taxonomically associated images and may be generated by photographing the object at different times or include an object of the same category as the object.

The object recognition apparatus 100 may acquire at least one piece of first feature information regarding each of the target image 330 and the plurality of images 310, 320, and 340 through 370 by using the first learning network model 40. The object recognition apparatus 100 may input to the second learning network model 50 at least one piece of second feature information generated as a result of combining together the at least one piece of first feature information.

The object recognition apparatus 100 may generate information about correlations between the target image 330 and the plurality of images 310, 320, and 340 through 370 by combining together the at least one piece of first feature information. For example, as a result of comparing first feature information regarding the target image 330 including an airplane with first feature information of the third image 340 including a car, it is possible to generate second feature information indicating that a wing portion, which is one of the differences between the airplane and the car, does not exist in the third image 340. As another example, second feature information indicating a wing portion in common may be generated as a result of respectively comparing the first feature information of the target image 330 with pieces of first feature information regarding the fourth image 350 including the airplane photographed in a different direction than that in the target image 330 and the fifth image 360 including a different type of airplane.

The object recognition apparatus 100 may acquire, as output data, a result of recognizing the object in the target image 330 by using generated at least one piece of second feature information as input data for the second learning network model 50. In this case, although the result of recognizing the object may be output as a value indicating a probability that the result matches each of a plurality of objects, this is merely an embodiment, and a form of the output data is not limited to the above-described example.

Figure 4:
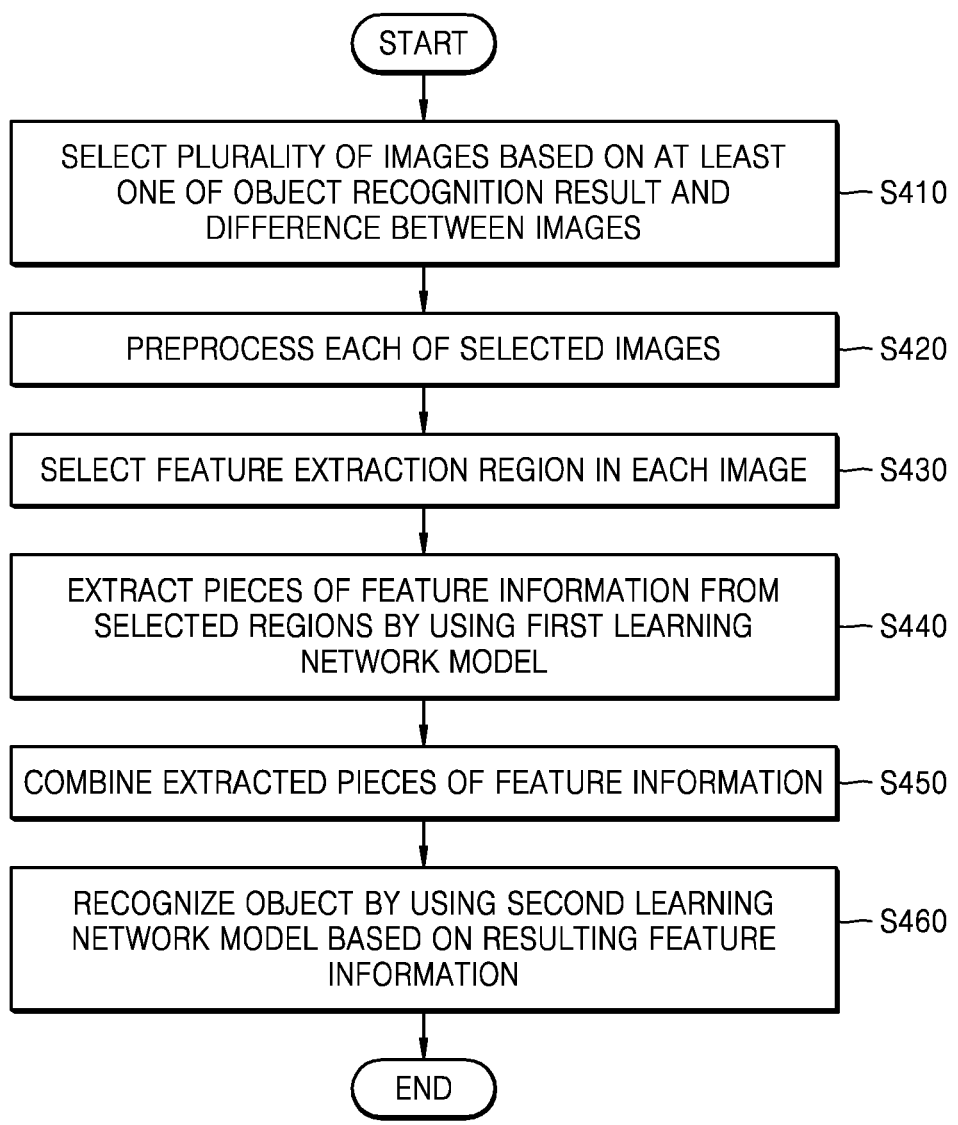
FIG. 4 is a flowchart of a method, performed by an object recognition apparatus, of recognizing an object in a target image by using an image selected from among a plurality of images, according to an embodiment.

FIG. 4 is a flowchart of a method, performed by an object recognition apparatus, of recognizing an object in a target image by using an image selected from among a plurality of images, according to an embodiment.

In operation S410, the object recognition apparatus may select a plurality of images to be used for recognizing an object in a target image, based on at least one of an object recognition result and a difference between frames.

According to an embodiment, in order to increase the efficiency of object recognition, the object recognition apparatus may select a plurality of images from the acquired entire image set, based on at least one of a result of object recognition in a previous image and a difference between frames. For example, as a result of comparing each of the images in the entire image set, the object recognition apparatus may select images having a feature difference therebetween that is within a preset range. By selecting the images having a feature difference therebetween within the preset range, the object recognition apparatus may exclude images unnecessary for recognizing a completely different object or an object and images that are not enough to provide new information according to features due to their small feature difference.

In operation S420, the object recognition apparatus may preprocess each of the selected plurality of images.

According to an embodiment, the object recognition apparatus may adjust parameters related to image quality, such as brightness, sharpness, etc. of the plurality of images, via preprocessing in order to set the same environment for comparison between the plurality of images. However, this is merely an embodiment, and the preprocessing may not include only the image quality adjustment process.

In operation S430, the object recognition apparatus may respectively select feature extraction regions in the preprocessed images.

According to an embodiment, when an object is photographed, the object recognition apparatus may estimate a region including an object in an image based on motion information of the object recognition apparatus. The object recognition apparatus may then select the estimated region as an extraction feature region in each image. For example, when the object recognition apparatus moves to the left side, the object recognition apparatus may move to the relatively right side a feature extraction region estimated as a region including the object.

The object recognition apparatus may select a feature extraction region in each image for use in object recognition, thereby reducing resources required for the object recognition.

In operation S440, the object recognition apparatus may respectively extract pieces of feature information from the selected feature extraction regions by using a first learning network model. In this case, the extracted feature information may be described as first feature information. In addition, a method, performed by the object recognition apparatus, of extracting first feature information by using the first learning network model is substantially the same as the methods described with reference to FIGS. 1 through 3. In this case, the object recognition apparatus may set an equal weight for the feature extraction regions being input to the first learning network model. However, this is merely an embodiment, and the object recognition apparatus may set a weight for a specific feature extraction region to be higher than weights for other feature extraction regions.

In operation S450, the object recognition apparatus may combine together the extracted pieces of feature information. In this case, the resulting feature information generated via the combination may be described as second feature information.

In operation S460, the object recognition apparatus may recognize, based on the resulting feature information, the object in the target image by using a second learning network model.

According to an embodiment, the object recognition apparatus may set different weights for at least one piece of second feature information input to the second learning network model according to each type of combination of the extracted pieces of feature information. However, this is merely an embodiment, and the object recognition apparatus may set an equal weight for the at least one piece of second feature information input to the second learning network model.

Figure 5:
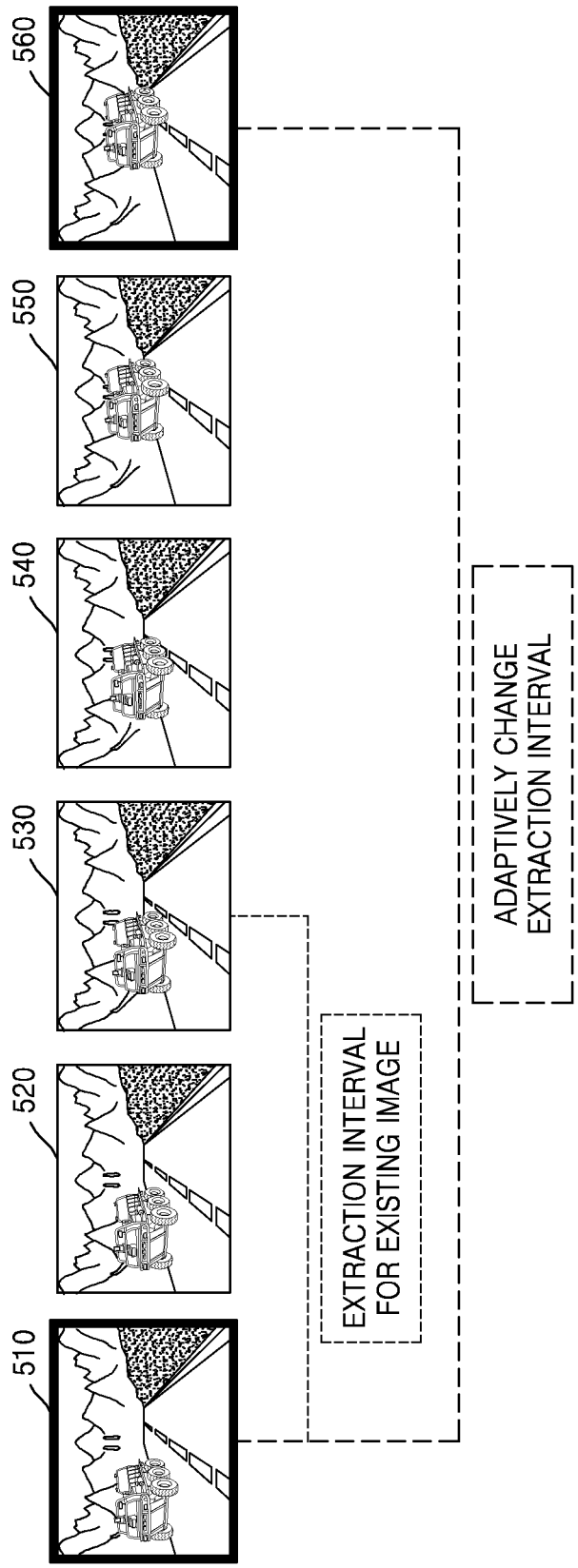
FIG. 5 is a flow diagram for explaining a method, performed by an object recognition apparatus, of selecting an image to be used for object recognition, according to an embodiment.

FIG. 5 is a flow diagram for explaining a method, performed by an object recognition apparatus, of selecting images 510 and 560 to be used for object recognition, according to an embodiment.

Referring to FIG. 5, the object recognition apparatus may obtain a plurality of images, i.e., first through sixth images 510 through 560) showing temporal or taxonomical correlations with a target image. The object recognition apparatus may select, based on differences between the first through sixth images 510 through 560 and a result of object recognition in a previous image, the first and sixth images 510 and 560 to be used for object recognition from among the first through sixth images 510 through 560.

For example, as a result of comparing features between the first through sixth images 510 through 560, the object recognition apparatus may select the first and sixth images 510 and 560 having a feature difference therebetween within a preset range. In this case, because the second through fifth images 520 through 550 are acquired at short time intervals, there may be little change in an object included in each of the second through fifth images 520 through 550. In this case, because resources required to process the images 520 through 560 are greater than information that the images can provide to recognize an object in a target image, use of the images may be less effective for object recognition than expected.

Thus, the object recognition apparatus may select only the first and sixth images 510 and 560 from among the first through sixth images 510 through 560 by further lengthening an image extraction interval. The selected first and sixth images 510 and 560 may be used for object recognition in the target image.

This is merely an embodiment, and when the object is recognized in the previous image, the object recognition apparatus may shorten an image extraction interval.

Figure 6:
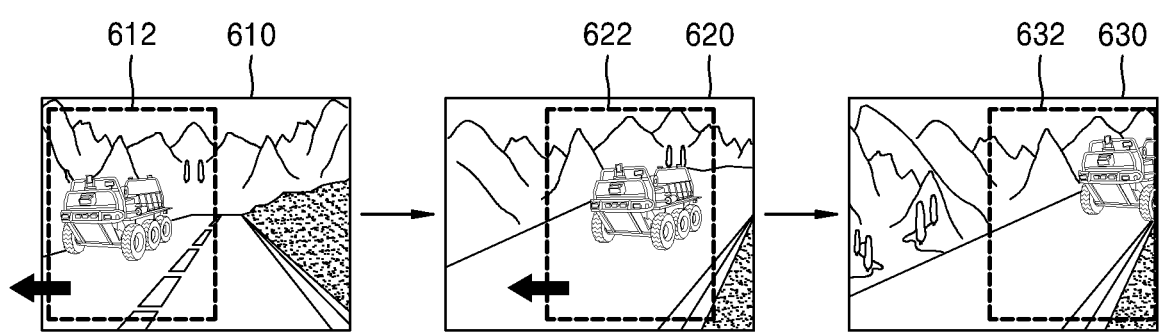
FIG. 6 is a diagram for explaining a method, performed by an object recognition apparatus, of extracting, based on motion information, a specific region for object recognition from a plurality of images, according to an embodiment.

FIG. 6 is a diagram for explaining a method, performed by an object recognition apparatus, of respectively extracting, based on motion information, specific regions for object recognition, i.e., first through third regions 612, 622, and 632, from a plurality of images, i.e., first through third images 610, 620, and 630, according to an embodiment.

Referring to FIG. 6, the object recognition apparatus may acquire motion information of a photographing device at the time when the first through third images 610, 620, and 630 are captured. In this case, the photographing device may be an object recognition apparatus or external device.

The object recognition apparatus may differently set a region extracted in each of the first through third images 610, 620, and 630 based on motion information of each of the first through third images 610, 620, and 630. It is herein assumed that the first region 612 that is a region extracted from the first image 610 is predetermined via object recognition in a previous frame.

In addition, the object recognition apparatus may check, based on motion information, that the photographing device moves to the left between time points when the first and second images 610 and 620 are respectively captured. Accordingly, the object recognition apparatus may determine as an extraction region the second region 622 corresponding to a portion in the second image 620 where the first region 612, which is an extraction region for the first image 610, is moved to the right.

Furthermore, the object recognition apparatus may check, based on motion information, that the photographing device moves to the left between time points when the second and third images 620 and 630 are respectively captured. Accordingly, the object recognition apparatus may determine as an extraction region the third region 632 corresponding to a portion in the third image 630 where the second region 622 that is the extraction region for the second image 620 is moved further to the right.

Figure 7:
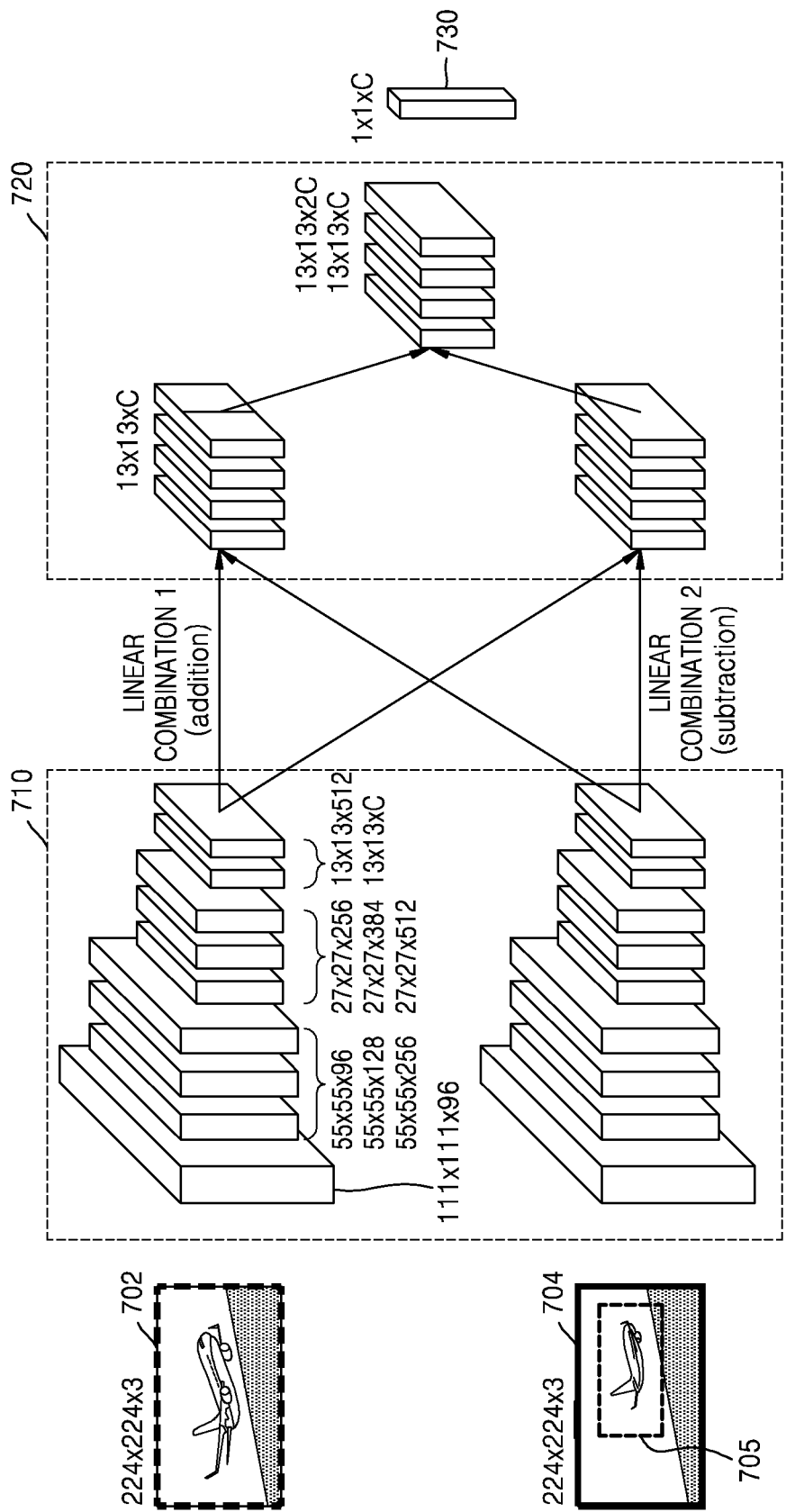
FIG. 7 is a diagram for explaining a learning network model used by an object recognition apparatus to recognize an object, according to an embodiment.

FIG. 7 is a diagram for explaining a learning network model used by an object recognition apparatus to recognize an object, according to an embodiment.

Referring to FIG. 7, the object recognition apparatus may obtain a target image 704 and a first image 702 having a temporal or taxonomical relationship with the target image 704. The object recognition apparatus may acquire at least one piece of first feature information from each of the target image 704 and the first image 702 by using a first learning network model 710.

In this case, the first learning network model 710 may be composed of a plurality of layers with different sizes (e.g., 55×55×96 and 55×55×128), and it is assumed in FIG. 7 that the first learning network model 710 consists of a plurality of neural networks such that first feature information may be acquired in parallel from a plurality of images, i.e., the target image 704 and the first image 702. However, this is merely an embodiment, and the object recognition apparatus may sequentially acquire pieces of first feature information respectively from the target image 704 and the first image 702 by using the first learning network model 710 composed of a single neural network.

The object recognition apparatus may linearly combine together the at least one piece of first feature information acquired from each of the first image 702 and the target image 704. In this case, the linear combination may include a first linear combination performed by adding pieces of first feature information acquired in a vector form and a second linear combination performed by subtracting pieces of first feature information acquired in a vector form. However, this is merely an embodiment, and a method whereby the object recognition apparatus combines together at least one piece of first feature information is not limited to the above example. For example, the object recognition apparatus may combine at least one piece of first feature information by assigning different weights thereto or in a nonlinear manner.

In addition, the object recognition apparatus may acquire at least one piece of second feature information as a result of linearly combining the at least one piece of first feature information. The object recognition apparatus may acquire, as output data 730, a result of recognizing the object in the target image 704 by applying, as input data, the at least one piece of second feature information to the second learning network model 720. In FIG. 7, C denotes the number of classes.

Figure 8:
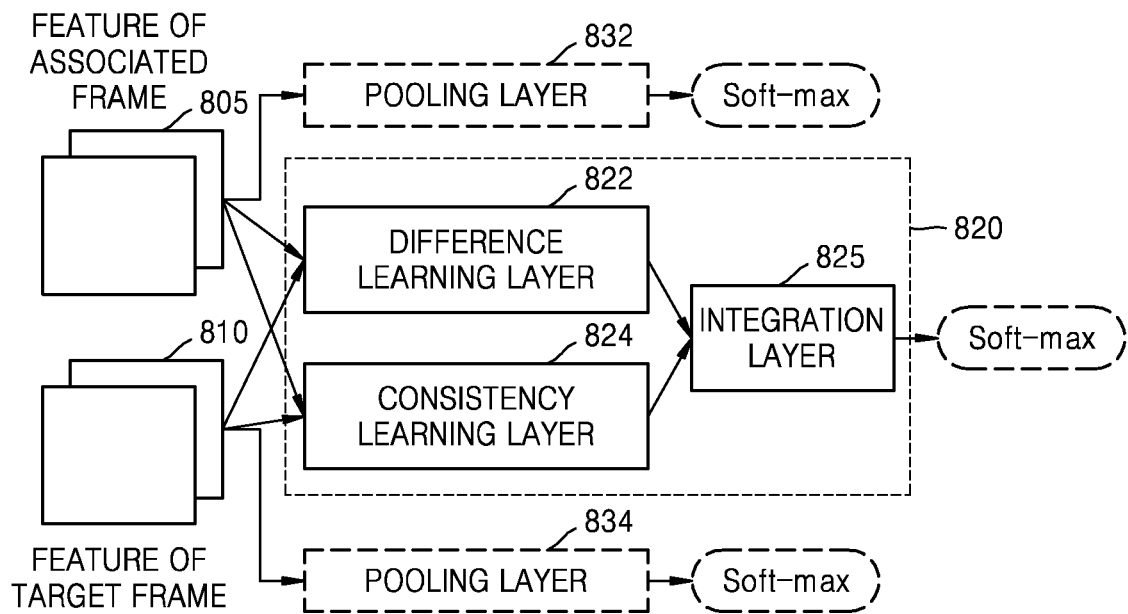
FIG. 8 is a diagram for explaining in more detail a second learning network model used by an object recognition apparatus to recognize an object, according to an embodiment.

FIG. 8 is a diagram for explaining in more detail a second learning network model 820 used by an object recognition apparatus to recognize an object, according to an embodiment.

Referring to FIG. 8, the object recognition apparatus may acquire at least one piece of first feature information of a target image 810 and at least one piece of first feature information of an associated image 805. In this case, the associated image 805 may mean an image temporally or taxonomically associated with the target image 810.

According to an embodiment, the object recognition apparatus may use, as input data of the second learning network model 820, second feature information generated as a result of linearly combining the at least one piece of feature information of the target image 810 with the at least one piece of feature information of the associated image 805. In this case, the second learning network model 820 may include a difference learning layer 822, a consistency learning layer 824, and an integration layer 825, but these layers are merely layers obtained by functionally classifying the second learning network model 820 in order to describe an operation of the second learning network model 820. The second learning network model 820 may be composed of a greater number of layers than three (3).

According to an embodiment, the difference learning layer 822, the consistency learning layer 824, and the integration layer 825 will be described in more detail below with reference to FIGS. 9 through 11.

According to an embodiment, the second learning network model 820 may further include at least one pooling layer 832, 834 for training to improve an expressive power with respect to achieving object recognition based on the at least one piece of second feature information. For example, the at least one pooling layer 832, 834 may be trained to extract a feature that can be used to clearly express a category for each image besides differences and similarities between images.

Figure 9:
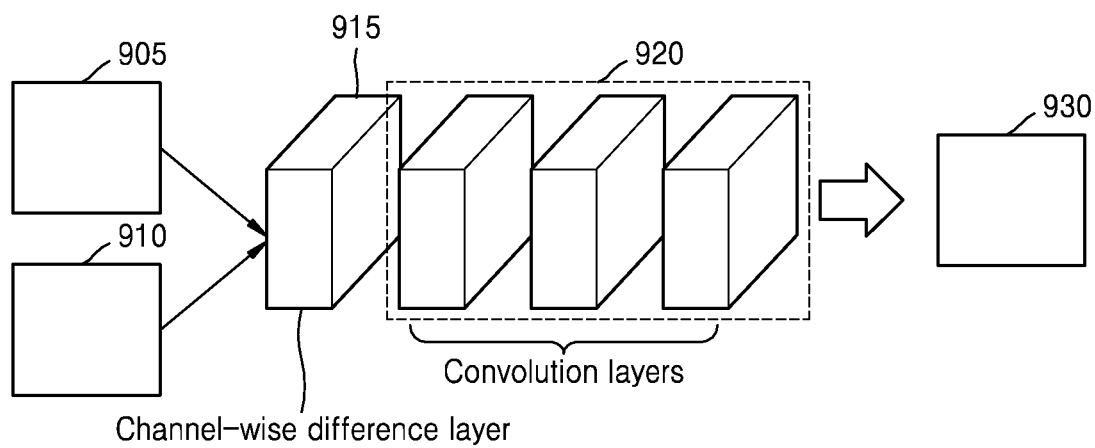
FIG. 9 is diagram for explaining a difference learning layer in a second learning network model according to an embodiment.

FIG. 9 is diagram for explaining a difference learning layer in a second learning network model according to an embodiment.

Referring to FIG. 9, the difference learning layer may include a channel-wise difference layer 915 and at least one convolution layer 920. However, this is merely an embodiment, and the difference learning layer of the present disclosure is not limited to the above example.

An object recognition apparatus may input to a second learning network model at least one piece of second feature information acquired as a result of combining at least one piece of first feature information of a target image 910 with at least one piece of first feature information of an associated image 905. In this case, the difference learning layer may be trained layer for generating a new feature to increase the accuracy of object recognition in the target image 910 by using a difference between the target image 910 and the associated image 905, which is acquired via a combination of at least one piece of first feature information thereof.

As a result of applying, as input data, the at least one piece of second feature information to the difference learning layer, the object recognition apparatus may acquire a new feature 930 from a difference between images.

Figure 10:
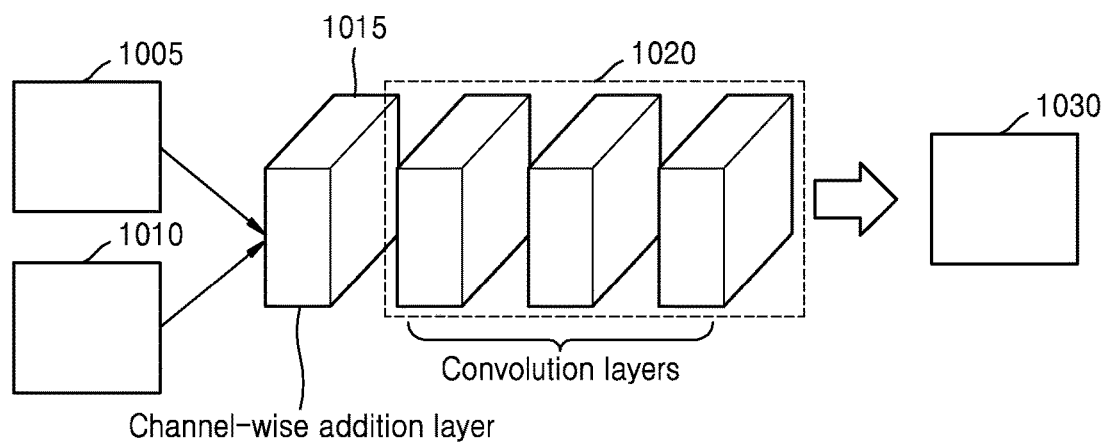
FIG. 10 is a diagram for explaining a consistency learning layer in a second learning network model, according to an embodiment.

FIG. 10 is a diagram for explaining a consistency learning layer in a second learning network model, according to an embodiment.

Referring to FIG. 10, the consistency learning layer may include a channel-wise addition layer 1015 and at least one convolution layer 1020. However, this is merely an embodiment, and the consistency learning layer of the present disclosure is not limited to the above example.

An object recognition apparatus may input to a second learning network model at least one piece of second feature information acquired as a result of combining at least one piece of first feature information of a target image 1010 with at least one piece of first feature information of an associated image 1005. In this case, the consistency learning layer may train a layer for generating a new feature to increase the accuracy of object recognition in the target image 1010 by using a sum across the target image 1010 and the associated image 10050, which is acquired via a combination of at least one piece of first feature information thereof.

As a result of applying, as input data, the at least one piece of second feature information to the consistency learning layer, the object recognition apparatus may acquire a new feature 1030 from a sum across images.

Figure 11:
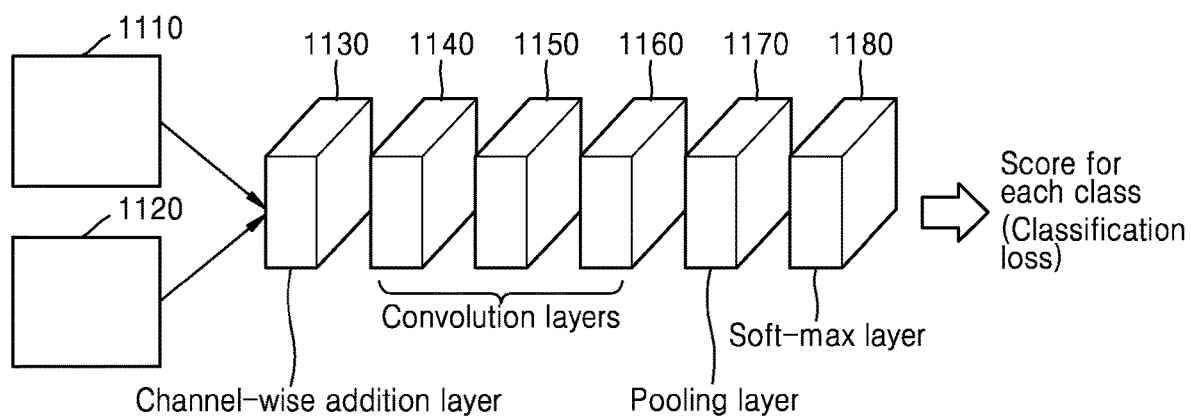
FIG. 11 is a diagram for explaining an integration layer in a second learning network model, according to an embodiment.

FIG. 11 is a diagram for explaining an integration layer in a second learning network model, according to an embodiment.

Referring to FIG. 11, the integration layer may include a concatenation layer 1130, at least one convolution layer 1140, 1150, and 1160, a pooling layer 1170, and a soft-max layer 1180.

However, this is merely an embodiment, and the integration layer of the present disclosure is not limited to the above example.

The object recognition apparatus may use as input data of the integration layer a new feature 1110 calculated from a difference between images as described with reference to FIG. 9 and a new feature 1120 calculated from a sum across images. The integration layer may train the convolution layer 1140, 1150, or 1160 to increase the accuracy of object recognition in a target frame by using the input new features 1110 and 1120. As the new features 1110 and 1120 respectively calculated from the difference between and sum across images are applied to the integration layer as input data, a result of object recognition in a target image may be output.

Figure 12:
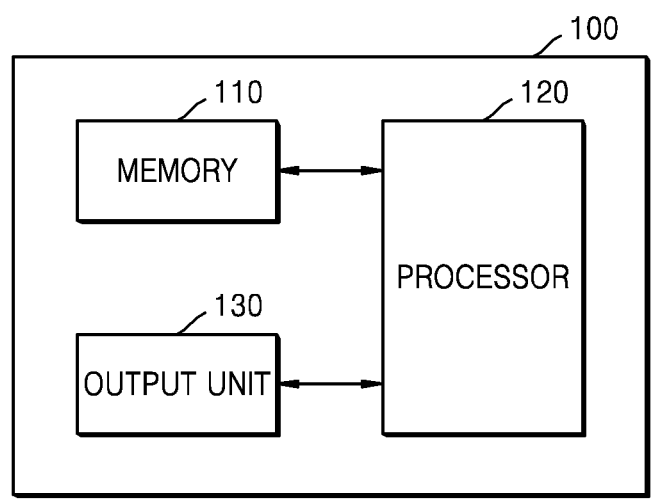
FIG. 12 is a block diagram of a configuration of an object recognition apparatus for recognizing an object according to an embodiment.

FIG. 12 is a block diagram of a configuration of the object recognition apparatus 100 for recognizing an object according to an embodiment.

Referring to FIG. 12, the object recognition apparatus 100 may include a memory 110, a processor 120, and an output unit 130.

The memory 110 may store programs (one or more instructions) for processing and control by the processor 120. The programs stored in the memory 110 may be divided into a plurality of modules according to functions. According to an embodiment, the memory 110 including a data learning unit and a data identification unit to be described later with reference to FIG. 13 may be implemented as a software module. The data learning unit and the data identification unit may each independently include a learning network model or share a single learning network model.

The processor 120 may include one or more cores (not shown), a graphic processor (not shown), and/or a connection path (e.g., a bus, etc.) via which signals are exchanged with other components.

According to an embodiment, the processor 120 may perform the operations of the object recognition apparatus 100, which are described above with reference to FIGS. 1 through 11.

For example, the processor 120 may obtain a target image including an object and at least one associated image related to the target image. Furthermore, the processor 120 may respectively acquire pieces of first feature information from the obtained plurality of images by using a first learning network model. The processor 120 may acquire at least one piece of second feature information by combining together the acquired pieces of first feature information respectively regarding the obtained plurality of images. The processor 120 may recognize, based on the acquired at least one piece of second feature information, an object in the target image by using a pre-generated second neural network model.

In addition, the processor 120 may further include a random access memory (RAM) (not shown) and a read-only memory (ROM) (not shown) for temporarily and/or permanently storing signals (or data) processed therein. Furthermore, the processor 120 may be implemented as a system on chip (SOC) including at least one of a graphic processor, a RAM, and a ROM.

The output unit 130 may display at least some of the obtained plurality of images. Furthermore, the output unit 130 may display a result of recognizing the object in the target image.

Figure 13:
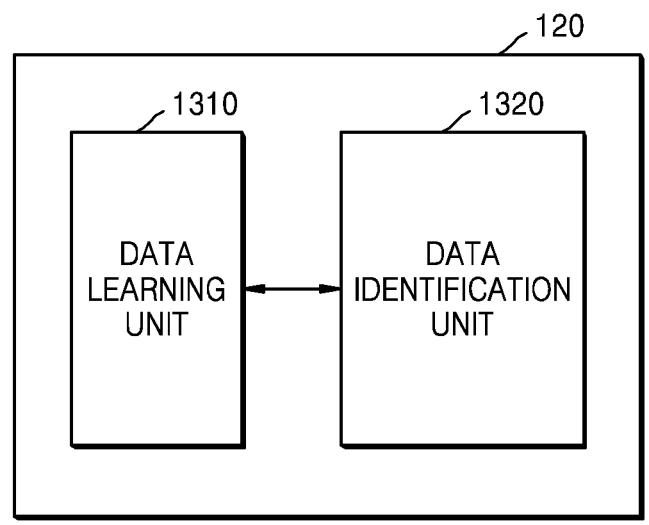
FIG. 13 is a diagram for explaining a processor according to an embodiment.

FIG. 13 is a diagram for explaining the processor 120 according to an embodiment.

Referring to FIG. 13, according to an embodiment, the processor 120 may include a data learning unit 1310 and a data identification unit 1320.

The data learning unit 1310 may learn criteria for respectively acquiring pieces of first feature information from a plurality of images. Furthermore, according to another embodiment, the data learning unit 1310 may learn criteria for recognizing an object based on at least one piece of second feature information generated as a result of combining together the pieces of first feature information respectively regarding the plurality of images.

The data identification unit 1320 may extract, based on the criteria learned by the data learning unit 1310, pieces of feature information respectively regarding a plurality of images or recognize the object in a target image.

At least one of the data learning unit 1310 or the data identification unit 1320 may be fabricated in the form of at least one hardware chip that may be mounted in the object recognition apparatus. For example, at least one of the data learning unit 1310 and the data identification unit 1320 may be manufactured in the form of a dedicated hardware chip for AI or as a part of an existing general-purpose processor (e.g., a central processing unit (CPU) or application processor) or dedicated graphics processor (e.g., a graphical processing unit (GPU)), and may be mounted in the above-described various types of object recognition apparatus.

In this case, the data learning unit 1310 and the data identification unit 1320 may be mounted in one object recognition apparatus, or be respectively mounted in different object recognition apparatuses. For example, one of the data learning unit 1310 and the data identification unit 1320 may be included in one object recognition apparatus while the other may be included in a server. Furthermore, the data learning unit 1310 and the data identification unit 1320 are connected to each other by wire or wirelessly, such that model information generated by the data learning unit 1310 may be provided to the data identification unit 1320, and data input to the data identification unit 1320 may be provided to the data learning unit 1310 as additional training data.

In addition, at least one of the data learning unit 1310 and the data identification unit 1320 may be implemented as a software module. When the at least one of the data learning unit 1310 and the data identification unit 1320 is implemented as a software module (or a program module including instructions), the software module may be stored in non-transitory computer readable recording media. Furthermore, in this case, at least one software module may be provided by an operating system (OS) or predetermined application. Alternatively, some of the at least one software module may be provided by the OS while the rest thereof may be provided by the predetermined application.

Figure 14:
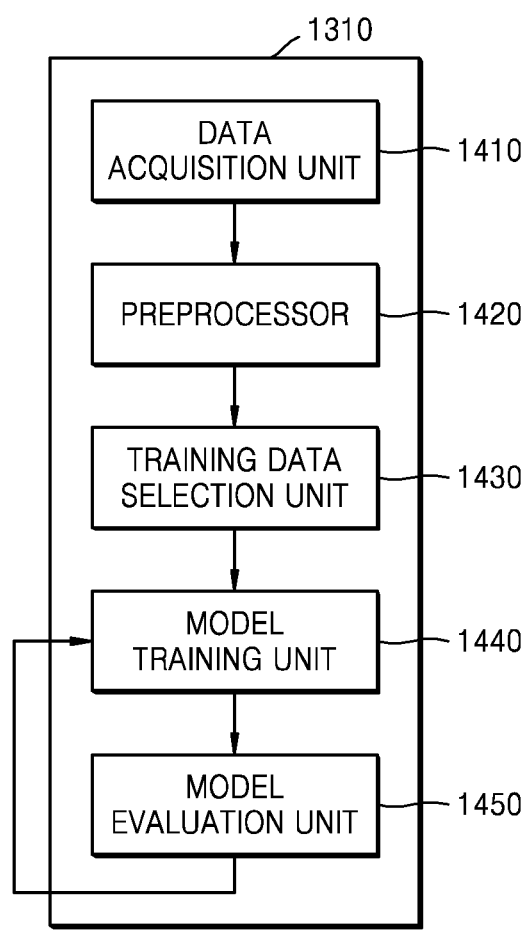
FIG. 14 is a block diagram of a data learning unit according to an embodiment.

FIG. 14 is a block diagram of the data learning unit 1310 according to an embodiment.

Referring to FIG. 14, according to some embodiments, the data learning unit 1310 may include a data acquisition unit 1410, a preprocessor 1420, a training data selection unit 1430, a model training unit 1440, and a model evaluation unit 1450. However, this is merely an embodiment, and the data learning unit 1310 may include fewer components than the above-described components or may further include other components in comparison to the above-described components.

The data acquisition unit 1410 may acquire as training data at least one captured image of an object or another object in the same category as the object. For example, the data acquisition unit 1410 may acquire at least one image from an object recognition apparatus including the data learning unit 1310 or an external object recognition apparatus that can communicate with the object recognition apparatus including the data learning unit 1310.

In addition, according to an embodiment, the at least one image acquired by the data acquisition unit 1410 may be one of images classified according to a category. For example, the data acquisition unit 1410 may perform training based on images classified according to a category.

The preprocessor 1420 may preprocess the acquired image such that the acquired image may be used for extraction of feature information regarding the image or training for recognition of an object in the image. The preprocessor 1420 may process the at least one image acquired for training into a preset format such that the model training unit 1440 to be described later may use the at least one image.

The training data selection unit 1430 may select an image necessary for training from among the preprocessed images. The selected image may be provided to the model training unit 1440. The training data selection unit 1430 may select an image necessary for training from among the preprocessed images according to set criteria.

The model training unit 1440 may learn a criterion with respect to which information is used to acquire feature information from an image or recognize an object in an image in a plurality of layers in a learning network model. For example, the model training unit 1440 may learn a first criterion with respect to which layer from among a plurality of layers in a learning network model is to extract feature information for use in recognition of the object. In this case, the first criterion may include types and number of pieces of first and second feature information used for recognizing an object by using a learning network model, types and level of combination operations, etc.

According to various embodiments, when a plurality of data recognition models are previously created, the model training unit 1440 may determine a data recognition model having a high correlation between input training data and basic training data as a data recognition model to be trained. In this case, the basic training data may be pre-classified according to the type of data, and the data recognition model may be previously created for each data type. For example, the basic training data may be pre-classified based on various criteria such as an area where the training data is generated, a time at which the training data is generated, a size of the training data, a genre of the training data, a creator of the training data, the type of an object in the training data, etc.

In addition, the model training unit 1440 may train the data recognition model by using reinforcement learning that uses a feedback regarding whether an object recognized via training is correct.

Furthermore, after the data recognition model is trained, the model training unit 1440 may store the trained data recognition model. In this case, the model training unit 1440 may store the trained data recognition model in a memory of an object recognition apparatus including the data identification unit 1320. Alternatively, the model training unit 1440 may store the trained data recognition model in a memory of the object recognition apparatus including the data identification unit 1320 that will be described below. Alternatively, the model training unit 1440 may store the trained data recognition model in a memory of a server connected by wire or wirelessly to the object recognition apparatus.

In this case, for example, the memory the trained data recognition model is stored may store together an instruction or data related to at least one of the other components of the object recognition apparatus. Furthermore, the memory may also store software and/or programs. For example, the programs may include kernel, middleware, application programming interface (API) and/or application program (or "application").

The model evaluation unit 1450 may input evaluation data to the data recognition model, and may cause the model training unit 1440 to train again the data recognition model when a recognition result obtained from the evaluation data does not satisfy a predetermined criterion. In this case, the evaluation data may be preset data for evaluating the data recognition model. Here, the evaluation data may include a matching ratio between a category of an object recognized based on the data recognition model and a category of an actual object.

In addition, when a plurality of learning network models exist, the model evaluation unit 1450 may evaluate whether each of the learning network models satisfies a predetermined criterion, and determine a learning network model satisfying the predetermined criterion as a final learning network model.

In addition, at least one of the data acquisition unit 1410, the preprocessor 1420, the training data selection unit 1430, the model training unit 1440, and the model evaluation unit 1450 included in the data learning unit 1310 may be fabricated in the form of at least one hardware chip that may be mounted in the object recognition apparatus. For example, the at least one of the data acquisition unit 1410, the preprocessor 1420, the training data selection unit 1430, the model training unit 1440, and the model evaluation unit 1450 may be manufactured in the form of a dedicated hardware chip for AI or as a part of a conventional general-purpose processor (e.g., a CPU or application processor) or dedicated graphics processor (e.g., a GPU), and may be mounted in the above-described various types of object recognition apparatus.

Furthermore, the data acquisition unit 1410, the preprocessor 1420, the training data selection unit 1430, the model training unit 1440, and the model evaluation unit 1450 may be mounted in one object recognition apparatus, or be respectively mounted in different object recognition apparatuses. For example, some of the data acquisition unit 1410, the preprocessor 1420, the training data selection unit 1430, the model training unit 1440, and the model evaluation unit 1450 may be included in the object recognition apparatus while the rest thereof may be included in a server.

In addition, at least one of the data acquisition unit 1410, the preprocessor 1420, the training data selection unit 1430, the model training unit 1440, and the model evaluation unit 1450 may be implemented as a software module. When the at least one of the data acquisition unit 1410, the preprocessor 1420, the training data selection unit 1430, the model training unit 1440, and the model evaluation unit 1450 is implemented as a software module (or a program module including instructions), the software module may be stored in non-transitory computer readable recording media. Furthermore, in this case, at least one software module may be provided by an OS or predetermined application. Alternatively, some of the at least one software module may be provided by the OS while the rest thereof may be provided by the predetermined application.

Figure 15:
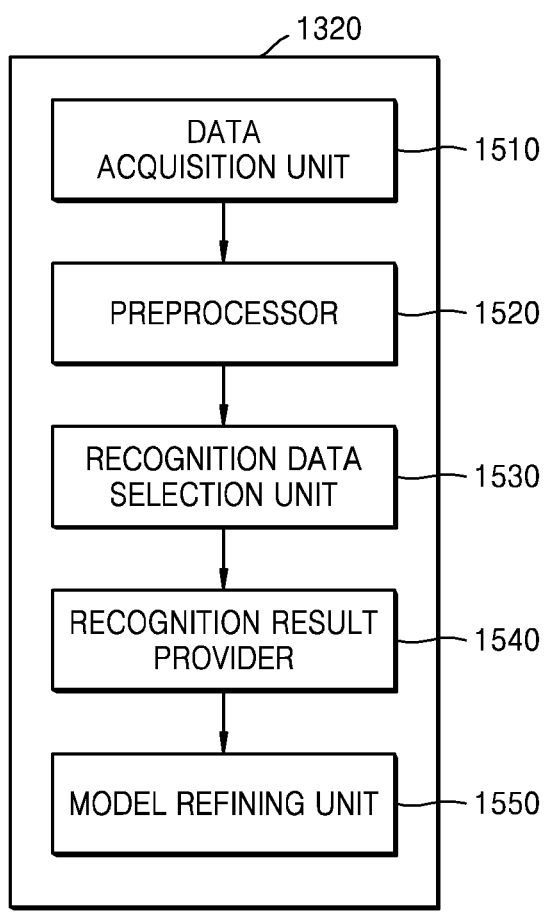
FIG. 15 is a block diagram of a data identification unit according to an embodiment.

FIG. 15 is a block diagram of the data identification unit 1320 according to an embodiment.

Referring to FIG. 15, according to some embodiments, the data identification unit 1320 may include a data acquisition unit 1510, a preprocessor 1520, a recognition data selection unit 1530, a recognition result provider 1540, and a model refining unit 1550.

The data acquisition unit 1510 may acquire at least one image necessary for extracting feature information regarding an image or recognizing an object in an image, and the preprocessor 1520 may preprocess the at least one acquired image such that the at least one acquired image may be used for the extraction of feature information regarding the image or recognition of the object in the image. The preprocessor 1520 may process the acquired image into a preset format such that the recognition result provider 1540 to be described later may use the acquired image for extraction of feature information regarding an image and recognition of an object in an image. The recognition data selection unit 1530 may select an image necessary for feature extraction or object recognition from among the preprocessed images. The selected image may be provided to the recognition result provider 1540.

The recognition result provider 1540 may extract feature information regarding an image or recognize an object in an image by applying the selected image to a learning network model according to an embodiment. A method of extracting feature information or recognizing an object by inputting at least one image to a learning network model may correspond to the method described above with reference to FIGS. 1 through 11.

The recognition result provider 1540 may provide a result of recognizing an object included in at least one image.

The model refining unit 1550 may provide information about evaluation of a result of object recognition in an image, which is provided by the recognition result provider 1540, to the model training unit 1440 described above with reference to FIG. 14, so as to modify and refine parameters for at least one feature extraction layer or a class classification network included in a learning network model.

In addition, at least one of the data acquisition unit 1510, the preprocessor 1520, the recognition data selection unit 1530, the recognition result provider 1540, and the model refining unit 1550 included in the data identification unit 1320 may be fabricated in the form of at least one hardware chip that may be mounted in the object recognition apparatus. For example, the at least one of the data acquisition unit 1510, the preprocessor 1520, the recognition data selection unit 1530, the recognition result provider 1540, and the model refining unit 1550 may be manufactured in the form of a dedicated hardware chip for AI or as a part of a conventional general-purpose processor (e.g., a CPU or application processor) or dedicated graphics processor (e.g., a GPU), and may be mounted in the above-described various types of object recognition apparatus.

Furthermore, the data acquisition unit 1510, the preprocessor 1520, the recognition data selection unit 1530, the recognition result provider 1540, and the model refining unit 1550 may be mounted in one object recognition apparatus, or be respectively mounted in different object recognition apparatuses. For example, some of the data acquisition unit 1510, the preprocessor 1520, the recognition data selection unit 1530, the recognition result provider 1540, and the model refining unit 1550 may be included in the object recognition apparatus while the rest thereof may be included in a server.

In addition, at least one of the data acquisition unit 1510, the preprocessor 1520, the recognition data selection unit 1530, the recognition result provider 1540, and the model refining unit 1550 may be implemented as a software module. When the at least one of the data acquisition unit 1510, the preprocessor 1520, the recognition data selection unit 1530, the recognition result provider 1540, and the model refining unit 1550 is implemented as a software module (or a program module including instructions), the software module may be stored in non-transitory computer readable recording media. Furthermore, in this case, at least one software module may be provided by an OS or predetermined application. Alternatively, some of the at least one software module may be provided by the OS while the rest thereof may be provided by the predetermined application.

Figure 16:
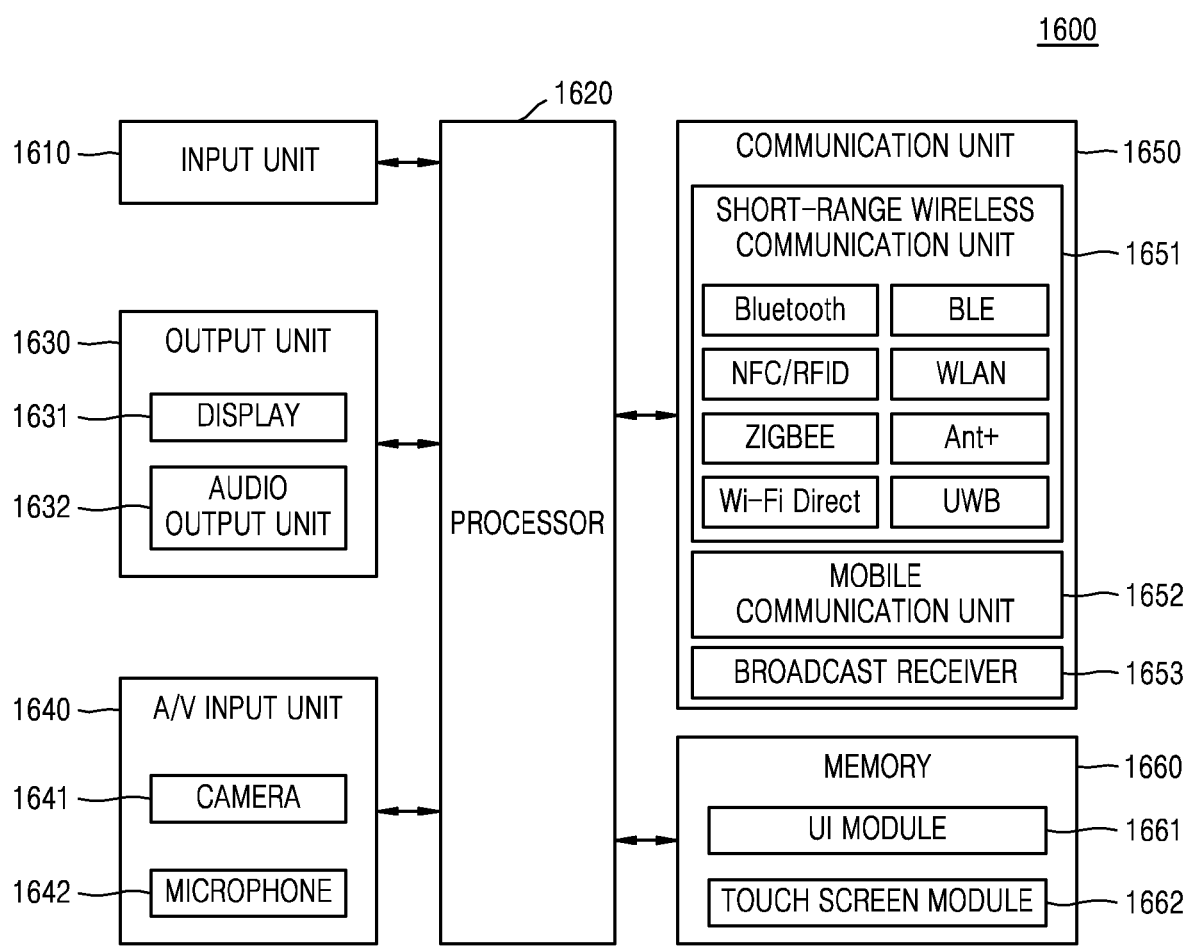
FIG. 16 is a block diagram of a configuration of an object recognition apparatus according to another embodiment.

FIG. 16 is a block diagram of an object recognition apparatus 1600 according to another embodiment.

Referring to FIG. 16, the object recognition apparatus 1600 according to the other embodiment may include an input unit 1610, an audio/video (A/V) input unit 1640, and a communication unit 1650 as well as a memory 1660, a processor 1620, and an output unit 1630 respectively corresponding to the memory 110, the processor 120, and the output unit 130.

The input unit 1610 is a means via which a user inputs data necessary for controlling the object recognition apparatus 1600. The input unit 1610 may include, but is not limited to, a key pad, a dome switch, a touch pad (a capacitive overlay type, a resistive overlay type, an infrared beam type, a surface acoustic wave type, an integral strain gauge type, a piezoelectric type, etc.), a jog wheel, and a jog switch.

According to an embodiment, the input unit 1610 may receive a user input for requesting capturing or display of an image via a touch pad. However, this is merely an embodiment, and the input unit 1610 may receive a user input for requesting playback of content from the user via an input device such as a remote controller.

The processor 1620 typically controls all operations of the object recognition apparatus 1600 and a signal flow between internal components of the object recognition apparatus 1600 and performs a function of processing data. For example, the processor 1620 may control the input unit 1610, the output unit 1630, the A/V input unit 1640, and the communication unit 1650 in its entirety by executing programs (one or more instructions) stored in the memory 1660.

According to an embodiment, in order to perform the functions of the object recognition apparatus 100 described above with reference to FIGS. 1 through 11, the processor 1620 may control components of the object recognition apparatus 1600 such that the components extract pieces of first feature information from images by using a learning network model and recognize an object in a target image by using at least one piece of second feature information generated as a result of combining the pieces of first feature information. Because the processor 1620 corresponds to the processor 120 of FIG. 12, detailed descriptions thereof are omitted below.

The output unit 1630 may output an obtained image to the object recognition apparatus 1600. Furthermore, the output unit 1630 may output a result of recognizing an object included in a target image. The output unit 1630 may include a display 1631 and an audio output unit 1632.

The display 1631 may display and output information processed by the object recognition apparatus 1600. When the display 1631 and a touch pad form a layer structure to form a touch screen, the display 1631 may be used as an input device as well as an output device.

The audio output unit 1632 may output audio data received from the communication unit 1650 or stored in the memory 1660.

The A/V input unit 1640 is for inputting an audio or video signal and may include a camera 1641, a microphone 1642, etc.

The camera 1641 captures an image in its recognition range. According to an embodiment, an image captured by the camera 1641 may be processed by the processor 1620 and displayed and output on the display 1631.

The communication unit 1650 may include one or more components that enable the object recognition apparatus 1600 to communicate with an external server (e.g., a SNS server, a cloud server, a content providing server, etc.) and other external devices. For example, the communication unit 1650 may include a short-range wireless communication unit 1651, a mobile communication unit 1652, and a broadcast receiver 1653.

The short-range wireless communication unit 1651 may include a Bluetooth communication unit, a Bluetooth Low Energy (BLE) communication unit, a Near Field Communication (NFC) unit, a wireless local area network (WLAN) or Wi-Fi communication unit, a Zigbee communication unit, an Infrared Data Association (IrDA) communication unit, a Wi-Fi Direct (WFD) communication unit, an Ultra-wideband (UWB) communication unit, and an Ant+ communication unit, but is not limited thereto.

The mobile communication unit 1652 transmits or receives a wireless signal to or from at least one of a base station, an external terminal, and a server on a mobile communication network. In this case, the wireless signal may include data in various formats according to transmission and reception of content.

The broadcast receiver 1653 receives broadcast signals and/or broadcast-related information from the outside via a broadcast channel. According to an embodiment, the object recognition apparatus 1600 may not include the broadcast receiver 1653.

According to an embodiment, the communication unit 1650 may receive an image from an external server and provide the received image to the processor 1620.

The memory 1660 may store programs (e.g., one or more instructions, a first learning network model, and a second learning network model) necessary for processing or control operations performed by the processor 1620 or store data (e.g. an object recognition result) input to or output from the object recognition apparatus 1600.

Programs stored in the memory 1660 may be classified into a plurality of modules according to their functions. For example, the programs may be classified into a user interface (UI) module 1661, a touch screen module 1662, etc.

The UI module 1661 may provide a specialized UI, a GUI, etc. interworking with the object recognition apparatus 1600 for each application. The touch screen module 1662 may detect a user's touch gesture on a touch screen and transmit information about the detected touch gesture to the processor 1620. According to an embodiment, the touch screen module 1662 may recognize and analyze a touch code. The touch screen module 1662 may be formed by separate hardware components including a controller.

The memory 1660 may include at least one storage media from among a flash memory-type memory, a hard disk-type memory, a multimedia card micro-type memory, a card-type memory (e.g., an SD card or an $_x$D memory), RAM, static RAM (SRAM), ROM, electrically erasable programmable ROM (EEPROM), PROM, a magnetic memory, a magnetic disc, and an optical disc.

The configuration of the object recognition apparatus 1600 is merely an embodiment, and each of the components of the object recognition apparatus 1600 may be integrated, added, or omitted according to the specification of an object recognition apparatus that is actually implemented. In other words, two or more components may be combined into a single component, or a single component may be split into two or more components. Functions performed by each component (or module) are intended to describe embodiments, and a specific operation or apparatus related to the functions does not limit the scope of the present disclosure.

The embodiments of the present disclosure may be written as programs executable on a computer, and may be implemented in general-use digital computers that execute the programs using a computer-readable recording medium. Examples of the computer-readable recording medium include storage media such as magnetic storage media (e.g., ROM, floppy disks, hard disks, etc.), optical recording media (e.g., CD-ROMs or DVDs), and carrier waves (e.g., transmission through the Internet).

While embodiments of the present disclosure have been described with reference to the figures, those of ordinary skill in the art will appreciate that the present disclosure may be implemented in other specific forms without departing from the technical spirit or essential characteristics thereof. Accordingly, the above embodiments and all aspects thereof are examples only and are not limiting.

What is claimed is:
1. An object recognition method comprising:
 extracting, by using a pre-generated first learning network model, a plurality of pieces of first feature information respectively regarding a target image and a plurality of images;

generating at least one piece of second feature information representing a correlation between the target image and one of the plurality of images; and recognizing, by applying the at least one piece of second feature information as input data, an object included in the target image by using a pre-generated second learning network model, wherein each of the target image and the plurality of images includes the object and each of the plurality of images is associated with the target image; and wherein the piece of second feature information is generated by combining the piece of first feature information regarding the target image and the piece of first feature information regarding the one of the plurality of images.

2. The object recognition method of claim 1, wherein the generating of the at least one piece of second feature information comprises:

generating the at least one piece of second feature information representing at least one of a similarity and a difference between the target image and the one of the plurality of images, wherein the at least one piece of second feature information is generated by linearly combining the piece of first feature information regarding the target image and the piece of first feature information respectively regarding the one of the plurality of images.

3. The object recognition method of claim 1, wherein the generating of the at least one piece of second feature information comprises:

comparing with one another the extracted pieces of first feature information respectively regarding the plurality of images; and selecting, from among the plurality of images, a plurality of images in which a difference between their corresponding pieces of first feature information is within a preset range; and combining the piece of first feature information regarding the target image and the pieces of first feature information respectively regarding the selected plurality of images.

4. The object recognition method of claim 1, further comprising determining a region where the object is located in each of the plurality of images, wherein the extracting of each piece of first feature information comprises extracting the first feature information of the object from the determined region.

5. The object recognition method of claim 1, wherein the recognizing of the object comprises:

setting a weight for the at least one piece of second feature information being input to the pre-generated second learning network model according to a type of the combination of the pieces of first feature information based on which the at least one piece of second feature information is generated; and recognizing the object by applying the at least one piece of second feature information to the pre-generated second learning network model according to the set weight.

6. The object recognition method of claim 1, wherein the recognizing of the object comprises recognizing the object by using the pre-generated second learning network model, by applying the at least one piece of second feature information and pieces of first feature information regarding at least some of the plurality of images as input data.

7. The object recognition method of claim 1, further comprising:

acquiring a plurality of captured training images of different shapes of the object according to at least one of a characteristic of the object, a movement of the object, and a movement of a photographing device; and determining, based on the acquired plurality of training images, parameters for a plurality of layers comprising the second learning network model.

8. An object recognition apparatus comprising:

a memory storing one or more instructions;

an output unit; and a processor configured to execute the one or more instructions stored in the memory to:

extract, by using a pre-generated first learning network model, a plurality of pieces of first feature information respectively regarding a target image and a plurality of images;

generate at least one piece of second feature information representing a correlation between the target image and one of the plurality of images; and recognize, by applying the at least one piece of second feature information as input data, an object included in the target image by using a pre-generated second learning network model, wherein each of the target image and the plurality of images includes the object and each of the plurality of images is associated with the target image; and wherein the piece of second feature information is generated by combining the piece of first feature information regarding the target image and the piece of first feature information regarding the one of the plurality of images.

9. The object recognition apparatus of claim 8, wherein the processor is further configured to execute the one or more instructions to:

generate the at least one piece of second feature information representing at least one of a similarity and a difference between the target image and the one of the plurality of images, wherein the at least one piece of second feature information is generated by linearly combining the piece of first feature information regarding the target image and the piece of first feature information respectively regarding the one of the plurality of images.

10. The object recognition apparatus of claim 8, wherein the processor is further configured to execute the one or more instructions to:

compare with one another the extracted pieces of first feature information respectively regarding the plurality of images and selecting, from among the plurality of images, a plurality of images in which a difference between their corresponding pieces of first feature information is within a preset range; and combine the piece of first feature information regarding the target image and the pieces of first feature information respectively regarding the selected plurality of images.

11. The object recognition apparatus of claim 8, wherein the processor is further configured to execute the one or more instructions to:

determine a region where the object is located in each of the plurality of images; and extract the first feature information of the object from the determined region.

12. The object recognition apparatus of claim 8, wherein the processor is further configured to execute the one or more instructions to:

set a weight for the at least one piece of second feature information being input to the pre-generated second learning network model according to a type of the combination of the pieces of first feature information based on which the at least one piece of second feature information is generated; and recognize the object by applying the at least one piece of second feature information to the pre-generated second learning network model according to the set weight.

13. The object recognition apparatus of claim 8, wherein the processor is further configured to execute the one or more instructions to recognize the object by using the pre-generated second learning network model, by applying the at least one piece of second feature information and pieces of first feature information regarding at least some of the plurality of images as input data.

14. The object recognition apparatus of claim 8, wherein the processor is further configured to execute the one or more instructions to:

acquire a plurality of captured training images of different shapes of the object according to at least one of a characteristic of the object, a movement of the object, and a movement of a photographing device; and determine, based on the acquired plurality of training images, parameters for a plurality of layers comprising the second learning network model.

15. A non-transitory computer readable recording medium having recorded thereon an object recognition program which, when executed by a computer, causes the computer to:

extract, by using a pre-generated first learning network model, a plurality of pieces of first feature information respectively regarding a target image and a plurality of images;

generate at least one piece of second feature information representing a correlation between the target image and one of the plurality of images; and recognize, by applying the at least one piece of second feature information as input data, an object included in the target image by using a pre-generated second learning network model, wherein each of the target image and the plurality of images includes the object and each of the plurality of images is associated with the target image; and wherein the piece of second feature information is generated by combining the piece of first feature information regarding the target image and the piece of first feature information regarding the one of the plurality of images.

* * * * *